US009750024B2

United States Patent
McNamara et al.

(10) Patent No.: US 9,750,024 B2
(45) Date of Patent: *Aug. 29, 2017

(54) INSERTING VIRTUAL CARRIER IN CONVENTIONAL OFDM HOST CARRIER IN COMMUNICATIONS SYSTEM

(71) Applicant: SCA IPLA HOLDINGS INC., New York, NY (US)

(72) Inventors: Darren McNamara, Clevedon (GB); Andrew Lillie, Bristol (GB); Peter Darwood, Bristol (GB); Martin Beale, Bristol (GB)

(73) Assignee: SCA IPLA HOLDINGS INC, New York, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 14/723,070

(22) Filed: May 27, 2015

(65) Prior Publication Data

US 2015/0264690 A1 Sep. 17, 2015

Related U.S. Application Data

(63) Continuation of application No. 13/983,685, filed as application No. PCT/GB2012/050210 on Feb. 1, 2012, now Pat. No. 9,071,396.

(30) Foreign Application Priority Data

Feb. 4, 2011 (GB) .................... 1101983.3

(51) Int. Cl.
*H04W 4/00* (2009.01)
*H04W 72/04* (2009.01)
(Continued)

(52) U.S. Cl.
CPC ....... *H04W 72/0453* (2013.01); *H04L 5/0032* (2013.01); *H04L 5/0039* (2013.01);
(Continued)

(58) Field of Classification Search
CPC ............. H04W 72/0453; H04W 72/04; H04W 72/042; H04W 72/0486; H04L 5/0032; H04L 5/0039; H04L 5/0054; H04L 5/0094
See application file for complete search history.

(56) References Cited

U.S. PATENT DOCUMENTS

2007/0248045 A1* 10/2007 Nagaraj .................. H04L 5/023
370/329
2011/0134861 A1* 6/2011 Seo .................... H04W 72/1289
370/329
(Continued)

FOREIGN PATENT DOCUMENTS

CN 101765208 A 6/2010
CN 101932023 A 12/2010
(Continued)

OTHER PUBLICATIONS

"Carrier Aggregation Operation in LTE-Advanced", Qualcomm Europe, 3GPP TSG RAN WG1 No. 54, R1-083193, pp. 1-5, (Aug. 2008), XP050316622.
(Continued)

*Primary Examiner* — Abdelnabi O Musa
(74) *Attorney, Agent, or Firm* — Oblon, McClelland, Maier & Neustadt, L.L.P.

(57) ABSTRACT

A network element for use in a mobile communications system and a method of using a network element for communicating data to/from mobile communications devices in a mobile communications system. The network element can provide a wireless access interface for commu-
(Continued)

nicating data to/from the mobile communications devices, the wireless access interface including: on a downlink a host carrier, the host carrier providing plural resource elements across a first frequency range; transmit data for a first group of mobile communications devices, wherein the data is distributed within the plural resource elements across the first frequency range; a virtual carrier via the wireless access interface, the virtual carrier providing one or more resource elements within a second frequency range which is within and smaller than the first frequency range; and transmit data for a second group of mobile communications devices via the virtual carrier.

19 Claims, 14 Drawing Sheets

(51) Int. Cl.
*H04L 27/26* (2006.01)
*H04L 5/00* (2006.01)

(52) U.S. Cl.
CPC .......... *H04L 5/0048* (2013.01); *H04L 5/0064* (2013.01); *H04L 5/0094* (2013.01); *H04L 27/2626* (2013.01); *H04W 72/04* (2013.01); *H04L 5/0007* (2013.01); *H04W 72/042* (2013.01); *H04W 72/0486* (2013.01)

(56) References Cited

U.S. PATENT DOCUMENTS

| | | |
|---|---|---|
| 2014/0010184 A1 | 1/2014 | McNamara et al. |
| 2014/0010212 A1 | 1/2014 | McNamara et al. |
| 2014/0018087 A1 | 1/2014 | McNamara et al. |
| 2014/0036821 A1 | 2/2014 | McNamara et al. |
| 2014/0036878 A1 | 2/2014 | McNamara et al. |
| 2014/0161108 A1 | 6/2014 | Lohr et al. |
| 2014/0219212 A1* | 8/2014 | Seo ........................ H04B 7/155 370/329 |

FOREIGN PATENT DOCUMENTS

| | | |
|---|---|---|
| WO | WO 2005 020613 | 3/2005 |
| WO | WO 2009 069936 | 6/2009 |

OTHER PUBLICATIONS

"Concept for downlink carrier aggregation in LTE-Advanced", Huawei, 3GPP TSG RAN WG1 Meeting No. 54bis, R1-083703, Total 4 pages, (Sep. 2008), XP050317045.
International Search Report issued Jun. 14, 2012 in PCT/GB12/050210 filed Feb. 1, 2012.
Great Britain Search Report issued Jun. 7, 20111 in GB 1101983.3 filed Feb. 4, 2011.
Combined Chinese Office Action and Search Report issued May 26, 2015 in Patent Application No. 201280007769.5 (with English translation of categories of cited documents).

* cited by examiner

INSERTING VIRTUAL CARRIER IN CONVENTIONAL OFDM HOST CARRIER IN COMMUNICATIONS SYSTEM

CROSS-REFERENCE TO RELATED APPLICATIONS

This application is a continuation of and is based upon and claims the benefit of priority under 35 U.S.C. §120 for U.S. Ser. No. 13/983,685, filed Sep. 25, 2013, the entire contents of which are incorporated herein by reference. U.S. Ser. No. 13/983,685 is a National Stage of PCT/GB12/050210, filed Feb. 1, 2012, and claims the benefit of priority under 35 U.S.C. §119 from British Patent Application 1101983.3 filed in the U.K. on Feb. 4, 2011.

TECHNICAL FIELD OF THE INVENTION

The present invention relates to methods, systems and apparatus for allocating transmission resources and transmitting data in mobile telecommunication systems.

BACKGROUND OF THE INVENTION

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customers house and periodically transmit information back to a central MTC server data relating to the customers consumption of a utility such as gas, water, electricity and so on.

Whilst it can be convenient for a terminal such as an MTC type terminal to take advantage of the wide coverage area provided by a third or fourth generation mobile telecommunication network there are at present disadvantages. Unlike a conventional third or fourth generation mobile terminal such as a smartphone, an MTC-type terminal is preferably relatively simple and inexpensive. The type of functions performed by the MTC-type terminal (e.g. collecting and reporting back data) do not require particularly complex processing to perform. However, third and fourth generation mobile telecommunication networks typically employ advanced data modulation techniques on the radio interface which can require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks.

SUMMARY OF THE INVENTION

According to a first aspect of the present invention there is provided a network element for use in a mobile communications system and a method of using a network element for communicating data to and/or from mobile communications devices in a mobile communications system. The network element is operable to provide a wireless access interface for communicating data to and/or from the mobile communications devices, the wireless access interface providing on a downlink a host carrier, the host carrier providing a plurality of resource elements across a first frequency range; transmit data for a first group of mobile communications devices, wherein the data is distributed within the plurality of resource elements across the first frequency range; provide a virtual carrier via the wireless access interface, the virtual carrier providing one or more resource elements within a second frequency range which is within and smaller than the first frequency range; and transmit data for a second group of mobile communications devices via the virtual carrier.

In conventional mobile telecommunication networks, data is typically transmitted from the network to the mobile terminals in a frequency carrier (first frequency range) where at least part of the data spans substantially the whole of the bandwidth of the frequency carrier. Normally a mobile terminal cannot operate within the network unless it can receive and decode data spanning the entire frequency carrier and therefore the use of mobile terminals with reduced bandwidth capability transceiver units is precluded.

However, in accordance with this aspect of the invention, a subset of the resource elements comprising a conventional carrier (a "host carrier") are defined as within a "virtual carrier"" are defined, where the host carrier has a certain bandwidth (first frequency range) and where the virtual carrier is within a conventional carrier ("host carrier") having a bandwidth (first frequency range) and has a reduced bandwidth (second frequency range) compared to the host carrier's bandwidth. Data for virtual carrier terminals is separately transmitted on the virtual carrier set of this subset of the resource elements.

Unlike data transmitted on a conventional downlink carrier, data transmitted on the virtual carrier can be received and decoded by a terminal without needing to process the full bandwidth of the downlink host carrier. Accordingly, data transmitted on the virtual carrier can be received and decoded using a reduced complexity transceiver unit.

Devices provided with reduced complexity transceiver units (onwards referred to as "virtual carrier terminals") could be constructed to beare less complex and less expensive than conventional LTE type devices (onwards referred to generally as LTE terminals).) but can still receive data using a conventional LTE type carrier. Accordingly, the deployment of such devices for MTC type applications within an LTE type network can become more attractive because the provision of the virtual carrier allows mobile terminals with less expensive and less complex transceiver units to be used.

Furthermore, in some examples, the virtual carrier inserted within the host carrier can be used to provide a logically distinct "network within a network". In other words data being transmitted via the virtual carrier can be treated as logically distinct from the data transmitted by the host carrier network. The virtual carrier can therefore be used to provide a so-called dedicated messaging network (DMN) which is "laid over" a conventional network and used to communicate messaging data to DMN devices (i.e. virtual carrier terminals).

In one embodiment of the invention, a plurality of virtual carriers may be inserted within a host carrier. In effect, the resources available to devices with a reduced capabilities transceiver unit may be increased by increasing the number of virtual carriers provided within a single host carrier.

In accordance with one embodiment of the invention, one or more resource elements comprise a virtual carrier signal for indicating that the wireless access interface provides one or more virtual carriers, for example, an indication of the location of a virtual carrier within the first frequency range and/or an indication of the bandwidth of a virtual carrier. In one example a mobile communications device having a receiver of the second type is operable to, upon detection of a virtual carrier signal, scan the first frequency range for a virtual carrier and/or configure its receiver to receive data transmitted in the virtual carrier frequency range. This facilitates the localization of a virtual carrier for terminals having a receiver of the second type (e.g. the reduced capability terminals).

Various further aspects and embodiments of the invention are provided in the appended claims, including but not limited to, a network element for use in a mobile communications network and a method of using a network element for communicating data to and/or from mobile communications devices.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Conventional Network

Figure 1:
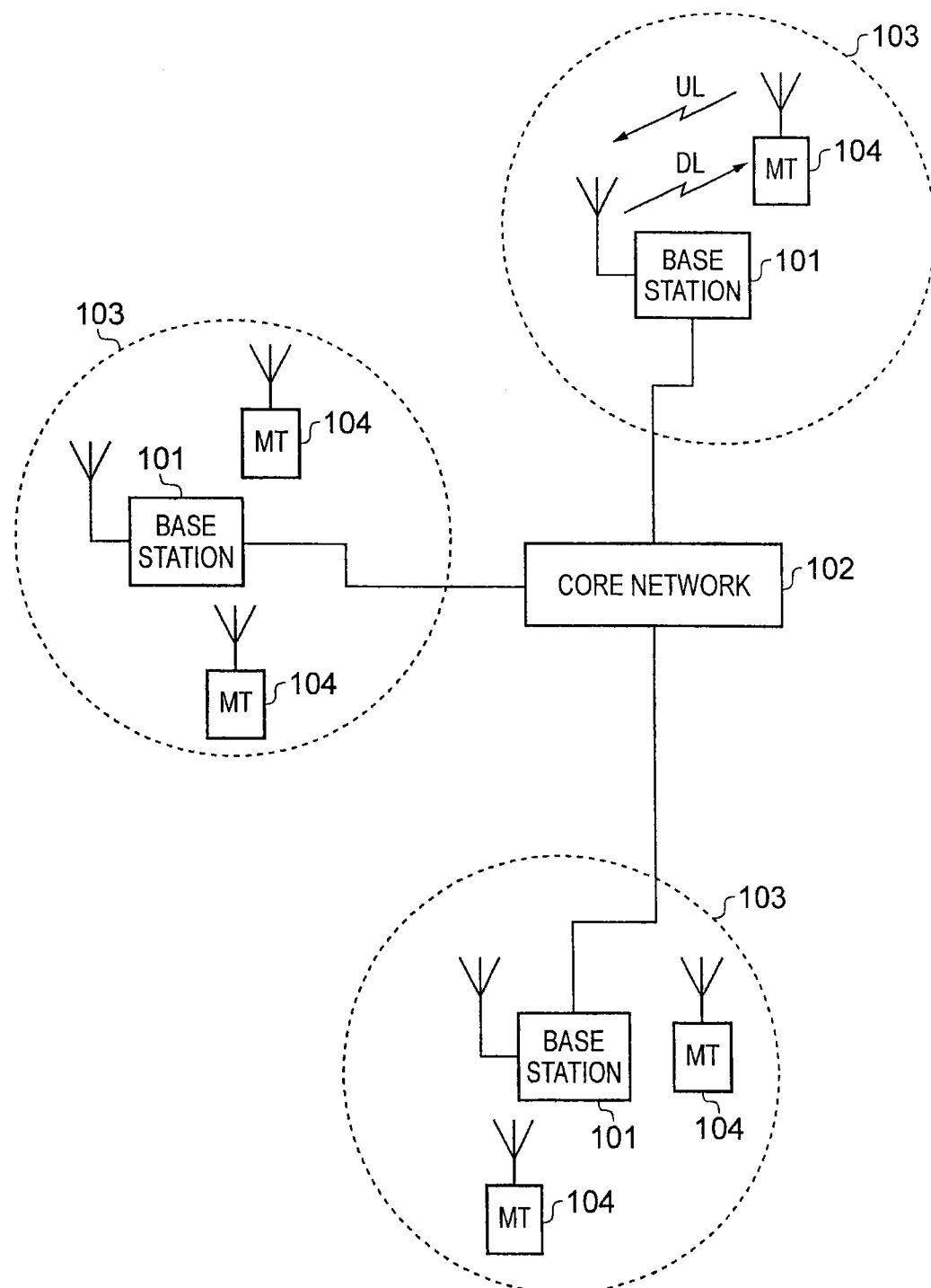
FIG. 1 provides a schematic diagram illustrating an example of a conventional mobile telecommunication network.

FIG. 1 provides a schematic diagram illustrating the basic functionality of a conventional mobile telecommunications network.

The network includes a plurality of base stations 101 connected to a core network 102. Each base station provides a coverage area 103 (i.e. a cell) within which data can be communicated to and from mobile terminals 104. Data is transmitted from a base station 101 to a mobile terminal 104 within a coverage area 103 via a radio downlink. Data is transmitted from a mobile terminal 104 to a base station 101 via a radio uplink. The core network 102 routes data to and from the mobile terminals 104 and provides functions such as authentication, mobility management, charging and so on.

Figure 2:
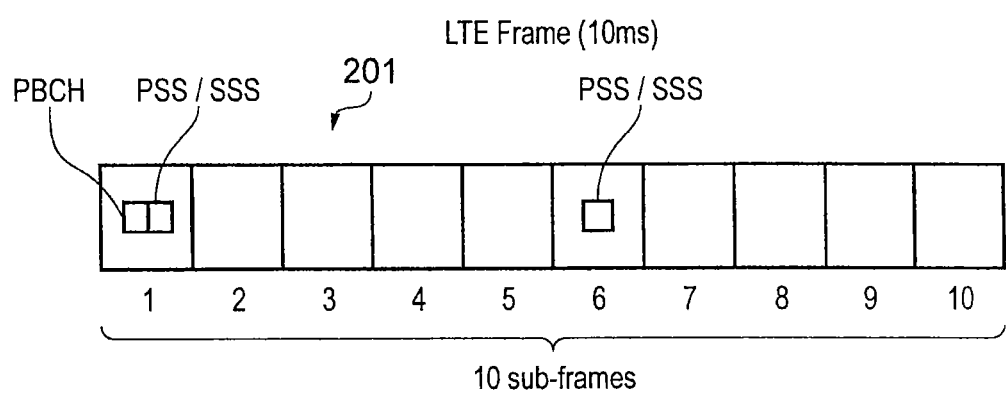
FIG. 2 provides a schematic diagram illustrating a conventional LTE downlink radio frame.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA). Data is transmitted on the uplink and on the downlink on a plurality of orthogonal sub-carriers. FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame. A primary broadcast channel (PBCH) is transmitted in the first sub-frame of the LTE frame. The PSS, SSS and PBCH are discussed in more detail below.

Figure 3:
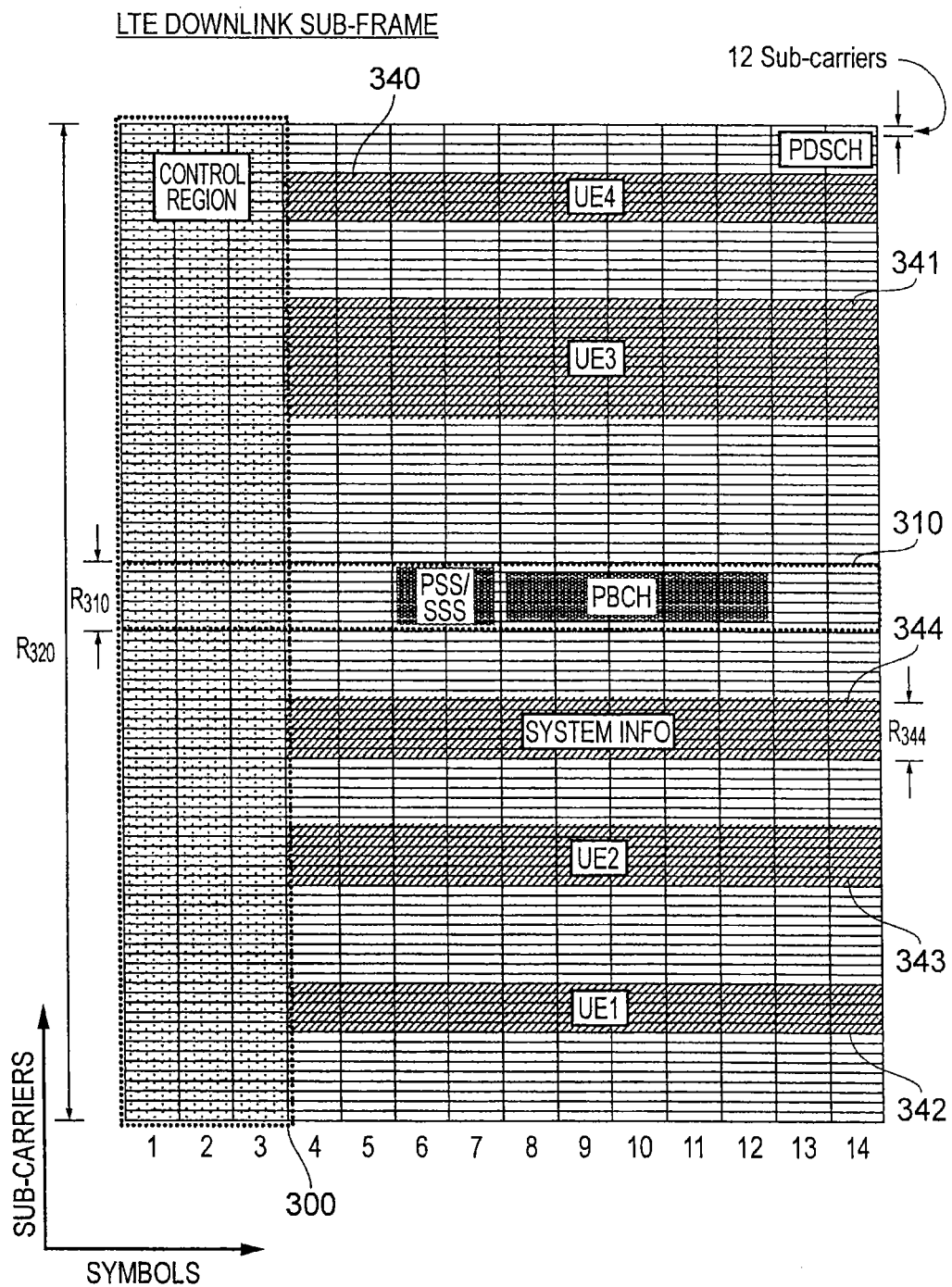
FIG. 3 provides a schematic diagram illustrating a conventional LTE downlink radio sub-frame.

FIG. 3 provides a schematic diagram providing a grid which illustrates the structure of an example of a conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spaced across a 20 MHz bandwidth. The smallest unit on which data can be transmitted in LTE is twelve sub-carriers transmitted over one sub-frame. For clarity, in FIG. 3, each individual resource element is not shown, instead each individual box in the sub-frame grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers, the resource allocation 343 for a second LTE terminal (UE2) extends over six blocks of twelve sub-carriers and so on.

Control channel data is transmitted in a control region 300 of the sub-frame comprising the first n symbols of the sub-frame where n can vary between one and three symbols for channel bandwidths of 3 MHz or greater and where n can vary between two and four symbols for channel bandwidths of 1.4 MHz. For clarity, the following description relates to host carriers with channel bandwidth of 3 MHz or greater where the maximum value of n will be 3. The data transmitted in the control region 300 includes data transmitted on the physical downlink control channel (PDCCH), the physical control format indicator channel (PCFICH) and the physical HARQ indicator channel (PHICH).

The PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the first block of resources 342, that UE2 has been allocated the second block of resources 343, and so on. The PCFICH contains control data indicating the size of the control region (i.e. between one and three symbols) and the PHICH contains HARQ (Hybrid Automatic Request) data indicating whether or not previously transmitted uplink data has been successfully received by the network.

In certain sub-frames, symbols in a central band 310 of the sub-frame are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow the LTE terminal 104 to achieve frame synchronisation and determine the cell identity of the enhanced Node B transmitting the downlink signal. The PBCH carries information about the cell, comprising a master information block (MIB) that includes parameters that the LTE terminals require to access the cell. Data transmitted to individual LTE terminals on the physical downlink shared channel (PDSCH) can be transmitted in the remaining blocks of resource elements of the sub-frame. Further explanation of these channels is provided in the following sections.

FIG. 3 also shows a region of PDSCH containing system information and extending over a bandwidth of $R_{344}$.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 3. As is known in the art, data transmitted on the PDCCH, PCFICH and PHICH is typically distributed on the sub-carriers across the entire bandwidth of the sub-frame. Therefore a conventional LTE terminal must be able to receive the entire bandwidth of the sub-frame in order to receive and decode the control region.

Conventional Camp on Procedure

Figure 4:
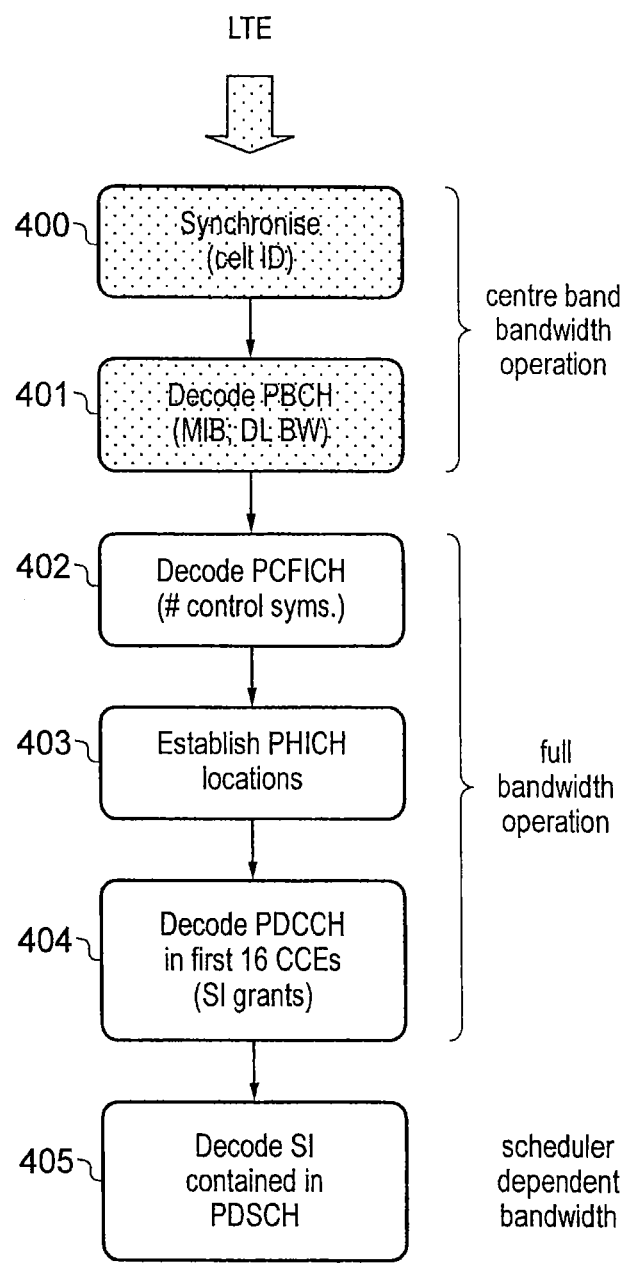
FIG. 4 provides a schematic diagram illustrating a conventional LTE "camp-on" procedure.

FIG. 4 illustrates an LTE "camp-on" process, that is the process followed by a terminal so that it can decode downlink transmissions which are sent by a base station via a downlink channel on a carrier band. Using this process, the terminal can identify the parts of the transmissions that include system information for the cell and thus decode configuration information for the cell.

As can be seen in FIG. 4, in a conventional LTE camp-on procedure, the terminal first synchronizes with the base station (step 400) using the PSS and SSS in the centre band 310 of the carrier as mentioned above. As can be seen with reference to FIG. 3 the centre band 310 has a bandwidth range R310, where the band is at the centre of the carrier (i.e. occupying the central sub-carriers).

The terminal detects this centre band and detects the PSS and SSS which indicate the cyclic prefix duration and the Cell ID. In LTE the PSS and SSS are only transmitted in the first and sixth sub-frames of each radio frame. Of course, in a different system, for example a non-LTE system, the band 310 may not be at the centre of the carrier band and may be wider or narrower than 72 sub-carriers or 1.08 MHz. Likewise, the sub-frames may be of a different size or sizes.

The terminal then decodes the PBCH (step 401), also carried on the centre band 310, where the PBCH includes in particular the Master Information Block (MIB). The MIB indicates in particular the bandwidth $R_{320}$ of the downlink carrier, the System Frame Number (SFN), and the PHICH configuration. Using the MIB carried on the PBCH, the terminal can then be made aware of the bandwidth $R_{320}$ of the carrier. Because the terminal also knows where the central band 310 is, it knows the exact range $R_{320}$ of the downlink carrier.

For each sub-frame, the terminal then decodes the PCFICH which is distributed across the entire width of carrier 320 (step 402). As discussed above, an LTE downlink carrier can be up to 20 MHz wide (1200 sub-carriers) and an LTE terminal therefore has to have the capability to receive and decode transmissions on a 20 MHz bandwidth in order to decode the PCFICH. At that stage, with a 20 MHz carrier band, the terminal operates at a much larger bandwidth (bandwidth of $R_{320}$) than during steps 400 and 401 (bandwidth of $R_{310}$) relating to synchronization and PBCH decoding.

The terminal then ascertains the PHICH locations (step 403) and decodes the PDCCH (step 404), in particular for identifying system information transmissions and for identifying its personal allocation grants. The allocation grants are used by the terminal to locate system information and to locate its data in the PDSCH. Both system information and personal allocations are transmitted on PDSCH and scheduled within the carrier band 320. Steps 403 and 404 also require the terminal to operate on the entire bandwidth R320 of the carrier band.

At steps 402 to 404, the terminal decodes information contained in the control region 300 of a sub-frame. As explained above, in LTE, the three control channels mentioned above (PCFICH, PHICH and PDCCH) can be found across the control region 300 of the carrier where the control regions extends over the range $R_{320}$ and occupies the first one, two or three OFDM symbols of each sub-frame as discussed above. In a sub-frame, typically the control channels do not use all the resource elements within the control region 300, but they are scattered across the entire region, such that a LTE terminal has to be able to simultaneously receive the entire control region 300 for decoding each of the three control channels.

The terminal can then decode the PDSCH (step 405) which contains system information or data transmitted for this terminal.

As explained above, in an LTE sub-frame the PDSCH generally occupies groups of resource elements which are neither in the control region nor in the resource elements occupied by PSS, SSS or PBCH. The data in the blocks of resource elements 340, 341, 342, 343 shown in FIG. 3 have a smaller bandwidth than the bandwidth of the entire carrier although to decode these blocks, a terminal first receives the PDCCH across the frequency range $R_{320}$ and if the PDCCH indicates that a PDSCH resource should be decoded, once it has received the entire sub-frame, it then decodes only the PDSCH in only the relevant frequency range indicated by the PDCCH. So for example, UE 1 discussed above decodes the whole control region 300 and then the data in the resource block 342.

Virtual Downlink Carrier

Certain classes of devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional LTE terminals. In many scenarios, providing low capability terminals such as those with a conventional high-performance LTE receiver unit capable of receiving and processing data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal. As set out below, in accordance with examples of the present invention a "virtual carrier" is inserted in a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier. Accordingly, data transmitted on the virtual carrier can be received and decoded using a reduced complexity receiver unit.

Figure 5:
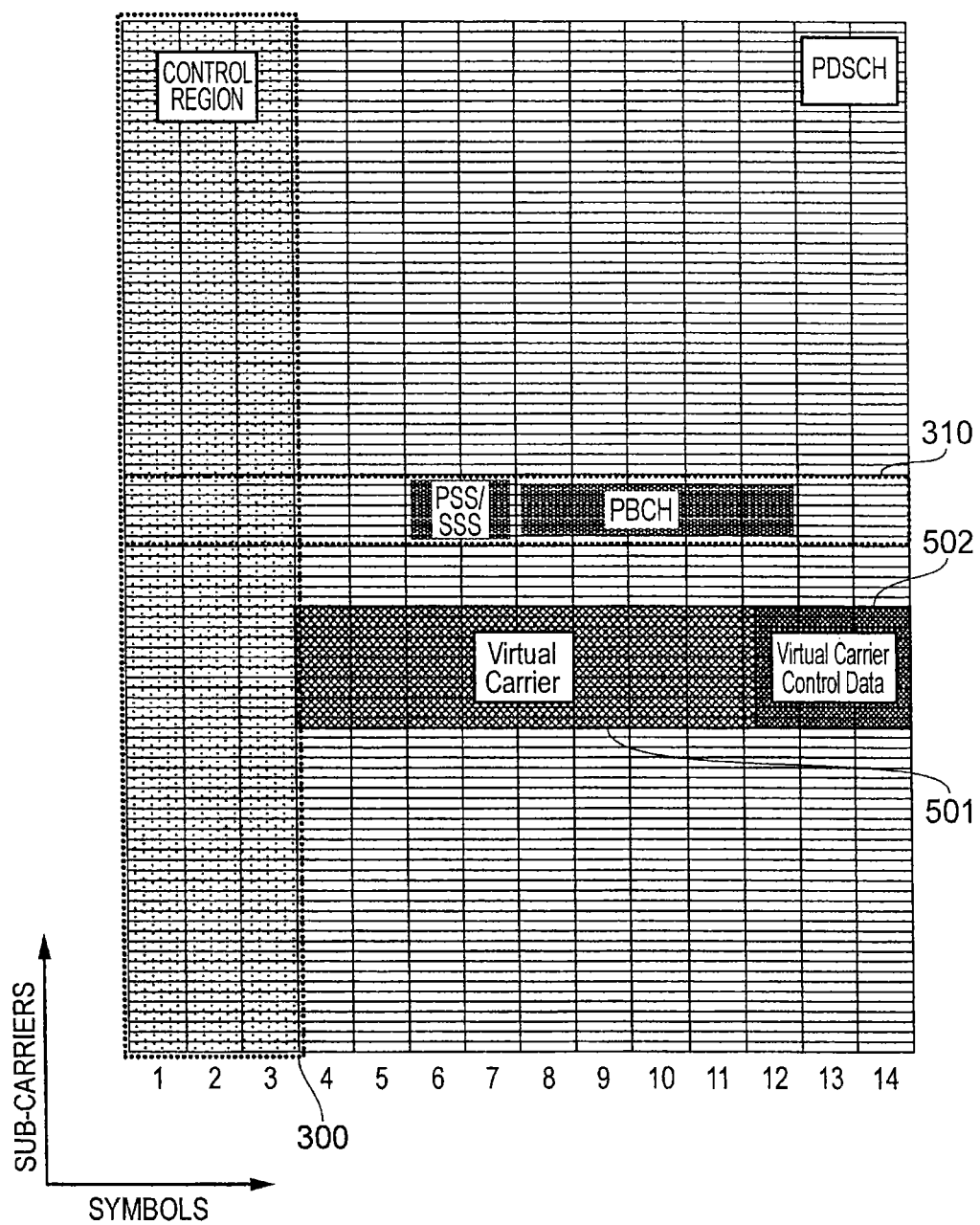
FIG. 5 provides a schematic diagram illustrating an LTE downlink radio sub-frame in which a virtual carrier has been inserted in accordance with an embodiment of the invention.

FIG. 5 provides a schematic diagram illustrating an LTE downlink sub-frame which includes a virtual carrier inserted in a host carrier in accordance with an example of the present invention.

In keeping with a conventional LTE downlink sub-frame, the first n symbols (n is three in FIG. 5) form the control region 300 which is reserved for the transmission of downlink control data such as data transmitted on the PDCCH. However, as can be seen from FIG. 5, outside of the control region 300 the LTE downlink sub-frame includes a group of resource elements below the central band 310 which form a virtual carrier 501. As will become clear, the virtual carrier 501 is adapted so that data transmitted on the virtual carrier 501 can be treated as logically distinct from the data transmitted in the remaining parts of the host carrier and can be decoded without first decoding all the control data from the control region 300. Although FIG. 5 shows the virtual carrier occupying frequency resources below the centre band, in general the virtual carrier can alternatively either occupy frequency resources above the centre band or frequency resources including the centre band. If the virtual carrier is configured to overlap any resources used by the PSS, SSS or PBCH of the host carrier, or any other signal transmitted by the host carrier that a mobile terminal operating on the host carrier would require for correct operation and expect to find in a known pre-determined location, the signals on the virtual carrier can be arranged such that these aspects of the host carrier signal are maintained.

As can be seen from FIG. 5, data transmitted on the virtual carrier 501 is transmitted across a limited bandwidth. This could be any suitable bandwidth providing it is smaller than that of the host carrier. In the example shown in FIG. 5 the virtual carrier is transmitted across a bandwidth comprising 12 blocks of 12 sub-carriers (i.e. 144 sub-carriers) which is equivalent to a 2.16 MHz transmission bandwidth. Accordingly, a terminal receiving data transmitted on the virtual carrier need only be equipped with a receiver capable of receiving and processing data transmitted over a bandwidth of 2.16 MHz. This enables low capability terminals (for example MTC type terminals) to be provided with simplified receiver units yet still be able to operate within an OFDM type communication network which, as explained above, conventionally requires terminals to be equipped with receivers capable of receiving and processing an OFDM signal across the entire bandwidth of the signal.

As explained above, in OFDM based mobile communication systems such as LTE, downlink data is dynamically assigned to be transmitted on different sub-carriers on a sub-frame by sub-frame basis. Accordingly, in every sub-frame the network must signal which sub-carriers on which symbols contain data relevant to which terminals (i.e. downlink grant signalling).

As can be seen from FIG. 3, in a conventional downlink LTE sub-frame this information is transmitted on the PDCCH during the first symbol or symbols of the sub-frame. However, as previously explained, the information transmitted in the PDCCH is spread across the entire bandwidth of the sub-frame and therefore cannot be received by a mobile communication terminal with a simplified receiver unit capable only of receiving the reduced bandwidth virtual carrier.

Accordingly, as can be seen in FIG. 5, the final symbols of the virtual carrier can be reserved as a virtual carrier control region 502 which is allocated for the transmission of control data indicating which resource elements of the virtual carrier 501 have been allocated. In some examples the number of symbols comprising the virtual carrier control region 502 is fixed for example three symbols. In other examples the virtual carrier control region 502 can vary in size, for example between one and three symbols.

The virtual carrier control region can be located at any suitable position within the virtual carrier for example in the first few symbols of the virtual carrier. In the example of FIG. 5 this could mean positioning the virtual carrier control region on the fourth, fifth and sixth symbols. However, fixing the position of the virtual carrier control region in the final symbols of the sub-frame can provide an advantage because the position of the virtual carrier control region need not vary even if the number of symbols of the host carrier control region varies. This simplifies the processing undertaken by mobile communication terminals receiving data on the virtual carrier because there is no need for them to determine the position of the virtual carrier control region every sub-frame as it is known that it will always be positioned in the final symbols of the sub-frame.

In a further embodiment, the virtual carrier control symbols may reference virtual carrier PDSCH transmissions in a separate sub-frame.

In some examples the virtual carrier may be located within the centre band 310 of the downlink sub-frame. This would minimise the reduction in host carrier PDSCH resources caused by the insertion of a virtual carrier since the resources occupied by the PSS/SSS and PBCH would be contained within the virtual carrier region and not the host carrier PDSCGH region. Therefore, depending on for example the expected virtual carrier throughput, the location of a virtual carrier can be appropriately chosen to either exist inside or outside the centre band according to whether the host or virtual carrier is chosen to bear the overhead of the PSS, SSS and PBCH.

Virtual Carrier "Camp-On" Process

As explained above, before a conventional LTE terminal can begin transmitting and receiving data in a cell, it must first camp on to the cell. An adapted camp-on process must also be provided before terminals can receive data on the virtual carrier.

Figure 6:
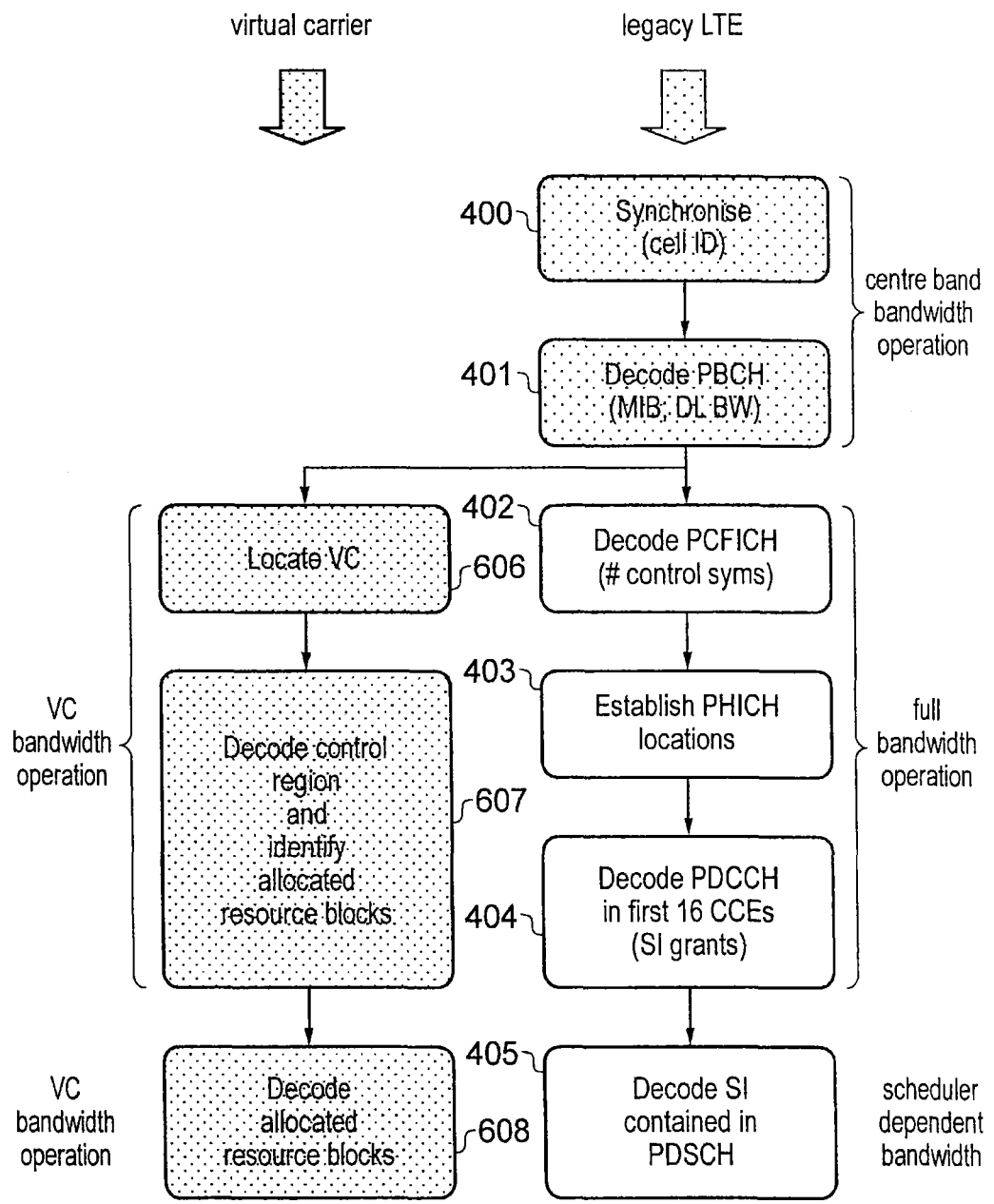
FIG. 6 provides a schematic diagram illustrating an adapted LTE "camp-on" procedure for camping on to a virtual carrier.

FIG. 6 shows a flow diagram illustrating a camp-on process according to an example of the present invention. The virtual carrier camp-on process is explained with reference to the sub-frame shown in FIG. 5 in which a virtual carrier with a bandwidth of 144 sub-carriers is inserted in a host carrier with a bandwidth of 1200 sub-carriers. As discussed above, a terminal having a receiver unit with an operational bandwidth of less than that of the host carrier cannot decode data in the control region of sub-frames of the host carrier. However, providing the receiver unit of a terminal has an operational bandwidth of at least twelve blocks of twelve sub-carriers (i.e. 2.16 MHz) then it can receive data transmitted on the example virtual carrier 502.

In the example of FIG. 6, the first steps 400 and 401 are the same as the conventional camp-on process shown in FIG. 4, although a virtual carrier terminal may extract additional information from the MIB as described below. Both terminals can use the PSS/SSS and PBCH to synchronize with the base station using the information carried on the 72 sub-carrier centre band within the host carrier. However, where the conventional LTE terminals then continue with the process by performing the PCFICH decoding step 402, which requires a receiver unit capable of receiving and decoding the host carrier control region 300, a terminal camping on to the cell to receive data on the virtual carrier (referred to from now on as a "virtual carrier terminal") performs steps 606 and 607 instead.

In a further embodiment of the present invention a separate synchronisation and PBCH functionality can be provided for the virtual carrier device as opposed to re-using the same conventional initial camp-on processes of steps 400 and 401 of the host carrier device.

Figure 7:
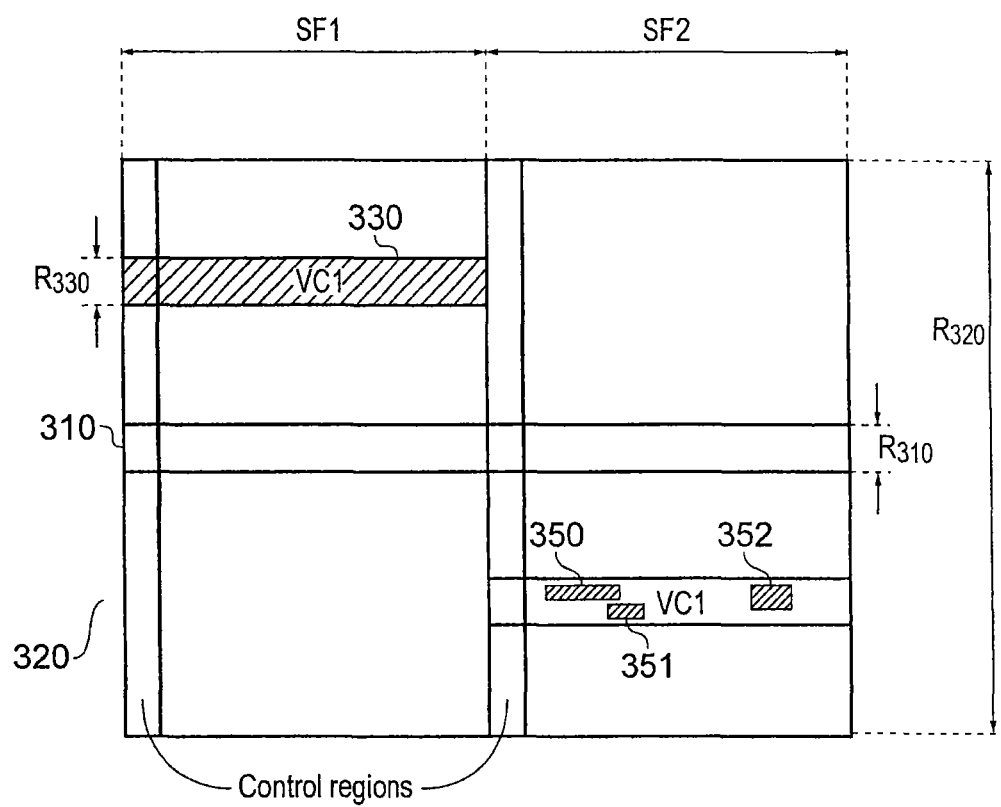
FIG. 7 provides a schematic diagram illustrating LTE downlink radio sub-frames in accordance with an embodiment of the present invention.

At step 606, the virtual carrier terminal locates a virtual carrier, if any is provided within the host carrier, using a virtual carrier-specific step. Various possible embodiments of this step are discussed further below. Once the virtual carrier terminal has located a virtual carrier, it can access information within the virtual carrier. For example, if the virtual carrier mirrors the conventional LTE resource allocation method, the virtual carrier terminal may then decode control portions within the virtual carrier, which can for example indicate which resource elements within the virtual carrier have been allocated for a specific virtual carrier terminal or for system information. For example, FIG. 7 shows the blocks of resource elements 350 to 352 within virtual carrier 330 that have been allocated for the sub-frame SF2. However, there is no requirement for the virtual carrier terminal to follow or mirror the conventional LTE process (e.g. steps 402-404) and these steps may for example be implemented very differently for a virtual carrier camp-on process.

Regardless of the virtual carrier terminal following a LTE-like step or a different type of step when performing step 607, the virtual carrier terminal can then decode the allocated resource elements at step 608 and thereby receive data transmitted by the base station. The data decoded in step 608 will include the remainder of the system information containing details of the network configuration.

Even though the virtual carrier terminal does not have the bandwidth capabilities to decode and receive downlink data if it was transmitted in the host carrier using conventional LTE, it can still access a virtual carrier within the host carrier having a limited bandwidth whilst re-using the initial LTE steps. Step 608 may also be implemented in a LTE-like manner or in a different manner. For example, the virtual carrier terminals may share a virtual carrier and have grants allocated to manage the virtual carrier sharing as shown in SF2 in FIG. 7, or, in another example, a virtual carrier terminal may have the entire virtual carrier allocated for its own downlink transmissions, or the virtual carrier may be entirely allocated to a virtual carrier terminal for a certain number of sub-frame only, etc.

There is therefore a degree of flexibility provided for this virtual carrier camp-on process. There is for example given the choice to adjust the balance between re-using or mirroring conventional LTE steps or processes, thereby reducing the terminal complexity and the need to implement new elements, and adding new virtual carrier specific aspects or implementations, thereby potentially optimizing the use of narrow-band virtual carriers, as LTE has been designed with the larger-band host carriers in mind.

Downlink Virtual Carrier Detection

As discussed above, the virtual carrier terminal has to locate the virtual carrier before it can receive and decode the virtual carrier transmissions. Several options are available for the virtual carrier presence and location determination, which can be implemented separately or in combination. Some of these options are discussed below.

To facilitate the virtual carrier detection, the virtual carrier location information may be provided to the virtual carrier terminal such that it can locate the virtual carrier, if any exists, more easily. For example, such location information may comprise an indication that one or more virtual carriers are provided within the host carrier or that the host carrier does not currently provide any virtual carrier. It may also comprise an indication of the virtual carrier's bandwidth, for example in MHz or blocks of resource elements. Alternatively, or in combination, the virtual carrier location information may comprise the virtual carrier's centre frequency and bandwidth, thereby giving the virtual carrier terminal the exact location and bandwidth of any active virtual carrier. In the event that the virtual carrier is to be found at a different frequency position in each sub-frame, according for example to a pseudo-random hoping algorithm, the location information can for example indicate a pseudo random parameter. Such parameters may include a starting frame and parameters used for the pseudo-random algorithm. Using these pseudo-random parameters, the virtual carrier terminal can then know where the virtual carrier can be found for any sub-frame.

Figure 8:
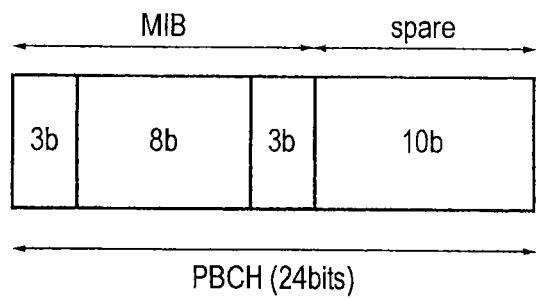
FIG. 8 provides a schematic diagram illustrating a physical broadcast channel (PBCH)
Figure 9:
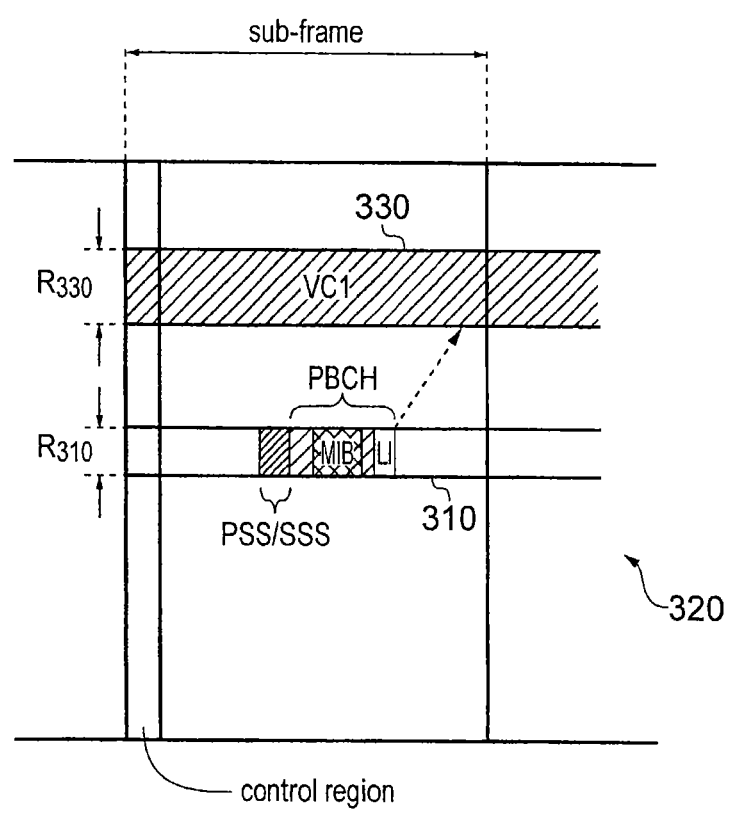
FIG. 9 provides a schematic diagram illustrating an LTE downlink radio sub-frame in accordance with an embodiment of the present invention.

An advantageous implementation which would require little change to the virtual carrier terminal (compared with a conventional LTE terminal) is to include this location information in the PBCH, which already carries the Master Information Block, or MIB in the host carrier centre band. As shown in FIG. 8, the MIB consists of 24 bits (3 bits to indicate DL bandwidth, 8 bits to indicate the System Frame Number or SFN, and 3 bits regarding the PHICH configuration). The MIB therefore comprises 10 spare bits that can be used to carry location information in respect of one or more virtual carriers. For example, FIG. 9 shows an example where the PBCH includes the MIB and location information ("LI") for pointing any virtual carrier terminal to a virtual carrier.

Alternatively, this Location Information can be provided for example in the centre band, outside of the PBCH. It can for example be always provided after and adjacent to the PBCH. By providing the Location Information in the centre band but outside of the PBCH, the conventional PBCH is not modified for the purpose of using virtual carriers, but a virtual carrier terminal will easily find the location information in order to detect the virtual carrier, if any.

The virtual carrier location information, if provided, can be provided elsewhere in the host carrier, but it is advantageous to provide it in the centre band because the virtual carrier terminal will preferentially configure its receiver to operate on the centre band and the virtual carrier terminal then does not need to adjust its receiver settings for finding the location information.

Depending on the amount of virtual carrier location information provided, the virtual carrier terminal can either adjust its receiver to receive the virtual carrier transmissions, or it may require further location information before it can do so.

If for example, the virtual carrier terminal was provided with location information indicating a virtual carrier presence and/or a virtual carrier bandwidth but not indicating any details as to the exact virtual carrier frequency range, or if the virtual carrier terminal was not provided with any location information, the virtual carrier terminal can then scan the host carrier for a virtual carrier (e.g. performing a so-called blind search process). Scanning the host carrier for a virtual carrier can be based on different approaches, some of which will be presented below.

Figure 10:
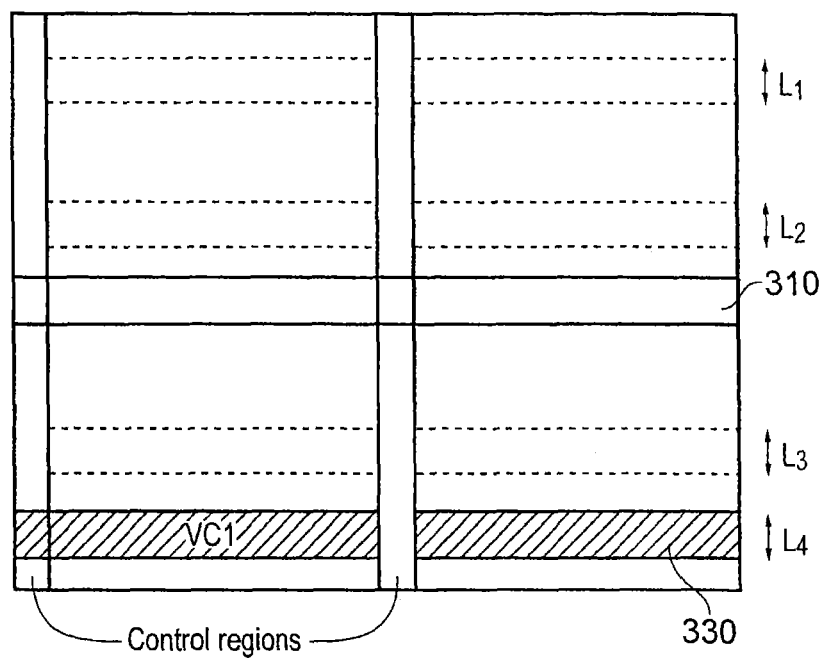
FIG. 10 provides a schematic diagram illustrating an LTE downlink radio sub-frames in which a virtual carrier has been inserted in accordance with an embodiment of the invention.
Figure 11A:
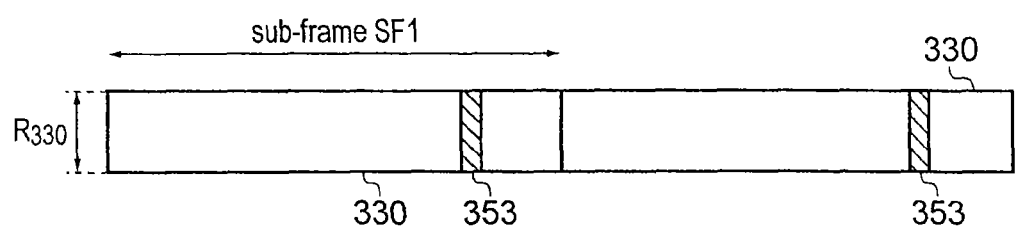
FIGS. 11A to 11D provide schematic diagrams illustrating positioning of location signals within a LTE downlink sub-frame according to embodiments of the present invention.
Figure 11B:
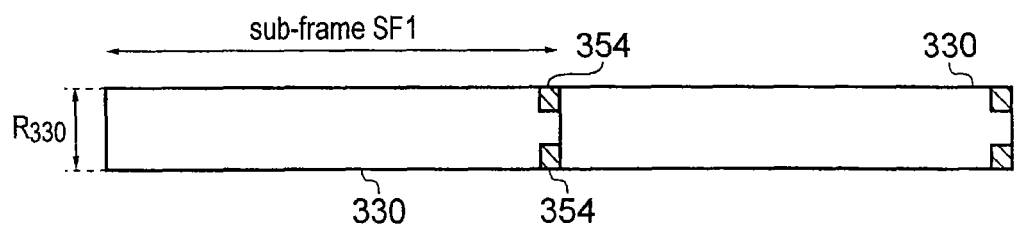
Figure 11C:
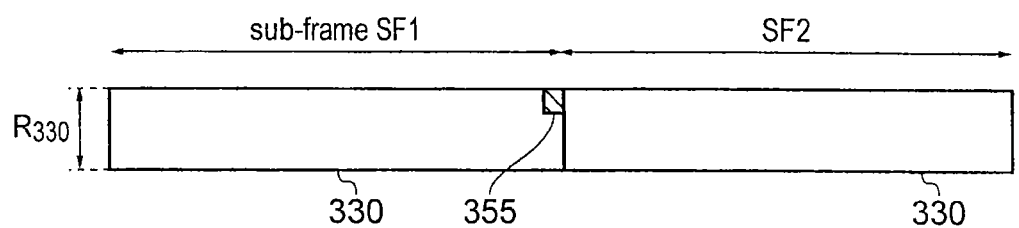

According to a first approach, the virtual carrier can only be inserted in certain pre-determined locations, as illustrated for example in FIG. 10 for a four-location example. The virtual carrier terminal then scans the four locations L1-L4 for any virtual carrier. If and when the virtual carrier terminal detects a virtual carrier, it can then "camp-on" the virtual carrier to receive downlink data. In this approach, the virtual carrier terminal has to know the possible virtual carrier locations in advance, for example by reading an internal memory. Detection of a virtual carrier could be accomplished by trying to decode a known physical channel on the virtual carrier. The successful decoding of such a channel, indicated for example by a successful cyclic redundancy check (CRC) on decoded data, would indicate the successful location of a virtual carrier According to a second approach, the virtual carrier may include location signals such that a virtual carrier terminal scanning the host carrier can detect such signals to identify the presence of a virtual carrier. Examples of possible location signals are illustrated in FIGS. 11A to 11D. In the examples of FIGS. 11A to 11C, the virtual carrier regularly sends an arbitrary location signal such that a terminal scanning a frequency range where the location signal is would detect this signal. An "arbitrary" signal is meant to include any signal that does not carry any information as such, or is not meant to be interpreted, but merely includes a specific signal or pattern that a virtual carrier terminal can detect. This can for example be a series of positive bits across the entire location signal, an alternation of 0 and 1 across the location signal, or any other suitable arbitrary signal. It is noteworthy that the location signal may be made of adjacent blocks of resource elements or may be formed of non adjacent blocks. For example, it may be located at every other block of resource elements at the top of the virtual carrier.

In the example of FIG. 11A, the location signal 353 extends across the range $R_{330}$ of the virtual carrier 330 and is always found at the same position in the virtual carrier within a sub-frame. If the virtual carrier terminal knows where to look for a location signal in a virtual carrier sub-frame, it can then simplify its scanning process by only scanning this position within a sub-frame for a location signal. FIG. 11B shows a similar example where every sub-frame includes a location signal 354 comprising two parts: one at the top corner and one at the bottom corner of the virtual carrier sub-frame, at the end of this sub-frame. Such a location signal may become useful if for example the virtual carrier terminal does not know the bandwidth of the virtual carrier in advance as it can facilitate a clear detection of the top and bottom edges of the virtual carrier band.

In the example of FIG. 11C, a location signal 355 is provided in a first sub-frame SF1, but not in a second sub-frame SF2. The location signal can for example be provided every two sub-frames. The frequency of the location signals can be chosen to adjust a balance between reducing scanning time and reducing overhead. In other words, the more often the location signal is provided, the less long it takes a terminal to detect a virtual carrier but the more overhead there is.

Figure 11D:
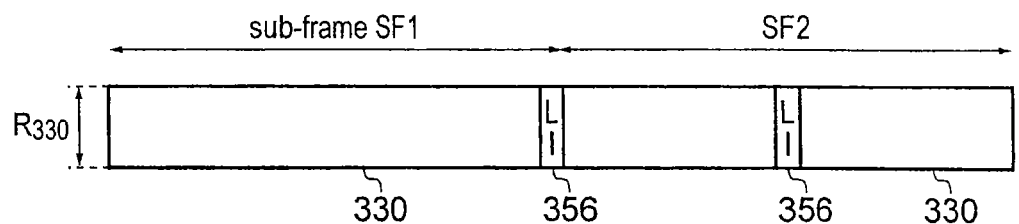

In the example of FIG. 11D, a location signal is provided where this location signal is not an arbitrary signal as in FIGS. 11A to 11C, but is a signal that includes information for virtual carrier terminals. The virtual carrier terminals can detect this signal when they scan for a virtual carrier and the signal may include information in respect of, for example, the virtual carrier bandwidth or any other virtual carrier-related information (location or non-location information). When detecting this signal, the virtual carrier terminal can thereby detect the presence and location of the virtual carrier. As shown in FIG. 11D, the location signal can, like an arbitrary location signal, be found at different locations within the sub-frame, and the location may vary on a per-sub-frame basis.

Dynamic Variation of Control Region Size of Host Carrier

As explained above, in LTE the number of symbols that make up the control region of a downlink sub-frame varies dynamically depending on the quantity of control data that needs to be transmitted. Typically, this variation is between one and three symbols. As will be understood with reference to FIG. 5, variation in the width of the host carrier control region will cause a corresponding variance in the number of symbols available for the virtual carrier. For example, as can be seen in FIG. 5, when the control region is three symbols in length and there are 14 symbols in the sub-frame, the virtual carrier is eleven symbols long. However, if in the next sub-frame the control region of the host carrier were reduced to one symbol, there would be thirteen symbols available for the virtual carrier in that sub-frame.

When a virtual carrier is inserted into a LTE host carrier, mobile communication terminals receiving data on the virtual carrier need to be able to determine the number of symbols in the control region of each host carrier sub-frame to determine the number of symbols in the virtual carrier in that sub-frame if they are to be able to use all available symbols that are not used by the host carrier control region.

Conventionally, the number of symbols forming the control region is signalled in the first symbol of every sub-frame in the PCFICH. However, the PCFICH is typically distributed across the entire bandwidth of the downlink LTE sub-frame and is therefore transmitted on sub-carriers which virtual carrier terminals capable only of receiving the virtual carrier cannot receive. Accordingly, in one embodiment, any symbols across which the control region could possibly extend are predefined as null symbols on the virtual carrier, i.e. the length of the virtual sub-carrier is set at (m–n) symbols, where m is the total number of symbols in a sub-frame and n is the maximum number of symbols of the control region. Thus, resource elements are never allocated for downlink data transmission on the virtual carrier during the first n symbols of any given sub-frame.

Although this embodiment is simple to implement it will be spectrally inefficient because during sub-frames when the control region of the host carrier has fewer than the maximum number of symbols, there will be unused symbols in the virtual carrier.

In another embodiment, the number of symbols in the control region of the host carrier is explicitly signalled in the virtual carrier itself. Once the number of symbols in the control region of the host carrier is known, the number of symbols in the virtual carrier can be calculated by subtracting the total number of symbols in the sub-frame from this number.

In one example an explicit indication of the host carrier control region size is given by certain information bits in the virtual carrier control region. In other words an explicit signalling message is inserted at a predefined position in the virtual carrier control region 502. This predefined position is known by each terminal adapted to receive data on the virtual carrier.

In another example, the virtual carrier includes a predefined signal, the location of which indicates the number of symbols in the control region of the host carriers. For example, a predefined signal could be transmitted on one of three predetermined blocks of resource elements. When a terminal receives the sub-frame it scans for the predefined signal. If the predefined signal is found in the first block of resource elements this indicates that the control region of the host carrier comprises one symbol; if the predefined signal is found in the second block of resource elements this indicates that the control region of the host carrier comprises two symbols and if the predefined signal is found in the third block of resource elements this indicates that the control region of the host carrier comprises three symbols.

In another example, the virtual carrier terminal is arranged to first attempt to decode the virtual carrier assuming that the control region size of the host carrier is one symbol. If this is not successful, the virtual carrier terminal attempts to decode the virtual carrier assuming that the control region size of the host carrier is two and so on, until the virtual carrier terminal successfully decodes the virtual carrier.

Downlink Virtual Carrier Reference Signals

As is known in the art, in OFDM based transmission systems such as LTE a number of sub-carriers in each symbol are typically reserved for the transmission of reference signals. The reference signals are transmitted on sub-carriers distributed throughout a sub-frame across the channel bandwidth and across the OFDM symbols. The reference signals are arranged in a repeating pattern and can thus be used by a receiver, employing extrapolation and interpolation techniques to estimate the channel function applied to the data transmitted on each sub-carrier. These reference signals are also typically used for additional purposes such as determining metrics for received signal power indications, automatic frequency control metrics and automatic gain control metrics. In LTE the positions of the reference signal bearing sub-carriers within each sub-frame are predefined and are therefore known at the receiver of each terminal.

In LTE downlink sub-frames, reference signals from each transmit antenna port are typically inserted on every sixth sub-carrier. Accordingly, if a virtual carrier is inserted in an LTE downlink sub-frame, even if the virtual carrier has a minimum bandwidth of one resource block (i.e. twelve sub-carriers) the virtual carrier will include at least some reference signal bearing sub-carriers.

There are sufficient reference signal bearing sub-carriers provided in each sub-frame such that a receiver need not accurately receive every single reference signal to decode the data transmitted on the sub-frame. However, as will be understood the more reference signals that are received, the better a receiver will be able to estimate the channel response and hence fewer errors are typically introduced into the data decoded from the sub-frame. Accordingly, in order to preserve compatibility with LTE communication terminals receiving data on the host carrier, in some examples of the present invention, the sub-carrier positions that would contain reference signals in a conventional LTE sub-frame are retained in the virtual carrier.

As will be understood, in accordance with examples of the present invention, terminals arranged to receive only the virtual carrier receive a reduced number of sub-carriers compared to conventional LTE terminals which receive each sub-frame across the entire bandwidth of the sub-frame. As a result, the reduced capability terminals receive fewer reference signals over a narrower range of frequencies which may result in a less accurate channel estimation being generated.

In some examples a simplified virtual carrier terminal may have a lower mobility which requires fewer reference symbols to support channel estimation. However, in some examples of the present invention the downlink virtual carrier includes additional reference signal bearing sub-carriers to enhance the accuracy of the channel estimation that the reduced capability terminals can generate.

In some examples the positions of the additional reference bearing sub-carriers are such that they are systematically interspersed with respect to the positions of the conventional reference signal bearing sub-carriers thereby increasing the sampling frequency of the channel estimation when combined with the reference signals from the existing reference signal bearing sub-carriers. This allows an improved channel estimation of the channel to be generated by the reduced capability terminals across the bandwidth of the virtual carrier. In other examples, the positions of the additional reference bearing sub-carriers are such that they are systematically placed at the edge of the bandwidth of the virtual carrier thereby increasing the interpolation accuracy of the virtual carrier channel estimates.

Alternative Virtual Carrier Arrangements

Figure 12:
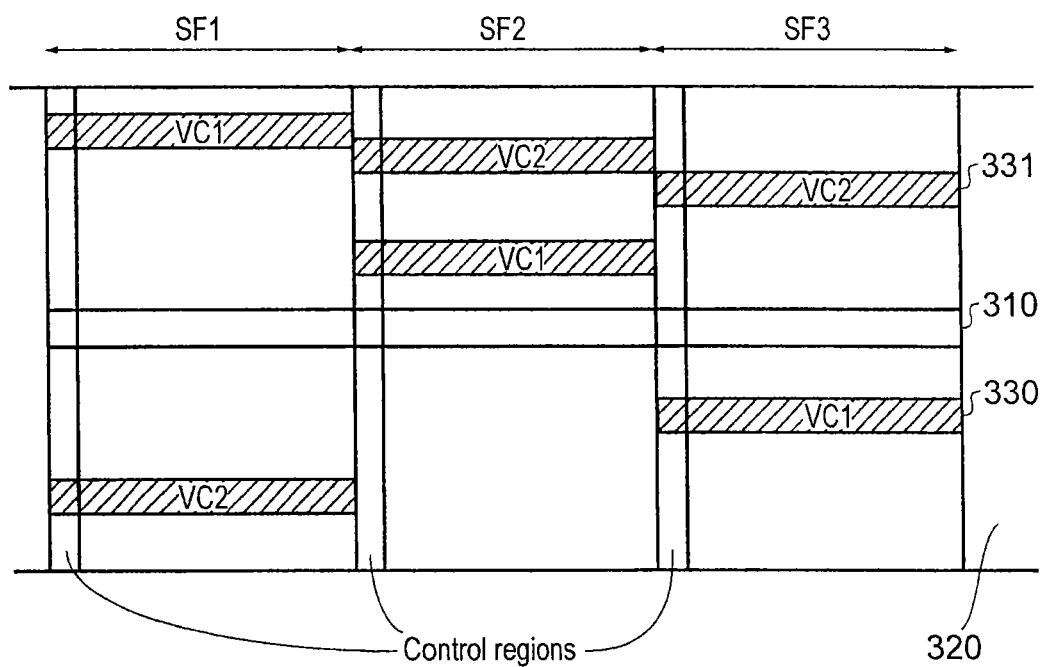
FIG. 12 provides a schematic diagram illustrating a group of sub-frames in which two virtual carriers change location within a host carrier band according to an embodiment of the present invention.

So far examples of the invention have been described generally in terms of a host carrier in which a single virtual carrier has been inserted as shown for example in FIG. 5. However, in some examples a host carrier may include more than one virtual carrier as shown for example in FIG. 12. FIG. 12 shows an example in which two virtual carriers VC1 (330) and VC2 (331) are provided within a host carrier 320. In this example, the two virtual carriers change location within the host carrier band according to a pseudo-random algorithm. However, in other examples, one or both of the two virtual carriers may always be found in the same frequency range within the host carrier frequency range and/or may change position according to a different mechanism. In LTE, the number of virtual carriers within a host carrier is only limited by the size of the host carrier. However, too many virtual carriers within the host carrier may unduly limit the bandwidth available for transmitting data to conventional LTE terminals and an operator may therefore decide on a number of virtual carrier within a host carrier according to, for example, a ratio of conventional LTE users/virtual carrier users.

In some examples the number of active virtual carriers can be dynamically adjusted such that it fits the current needs of conventional LTE terminals and virtual carrier terminals. For example, if no virtual carrier terminal is connected or if their access is to be intentionally limited, the network can arrange to begin scheduling the transmission of data to LTE terminals within the sub-carriers previously reserved for the virtual carrier. This process can be reversed if the number of active virtual carrier terminals begins to increase. In some examples the number of virtual carriers provided may be increased in response to an increase in the presence of virtual carrier terminals. For example if the number of virtual terminals present in a network or area of a network exceeds a threshold value, an additional virtual carrier is inserted in the host carrier. The network elements and/or network operator can thus activate or deactivate the virtual carriers whenever appropriate.

The virtual carrier shown for example in FIG. 5 is 144 sub-carriers in bandwidth. However, in other examples a virtual carrier may be of any size between twelve sub-carriers to 1188 sub-carriers (for a carrier with a 1200 sub-carrier transmission bandwidth). Because in LTE the centre band has a bandwidth of 72 sub-carriers, a virtual carrier terminal in an LTE environment preferentially has a receiver bandwidth of at least 72 sub-carriers (1.08 MHz) such that it can decode the centre band 310, therefore a 72 sub-carrier virtual carrier may provide a convenient implementation option. With a virtual carrier comprising 72 sub-carriers, the virtual carrier terminal does not have to adjust the receiver's bandwidth for camping on the virtual carrier which may therefore reduce complexity of performing the camp-on process, but there is no requirement to have the same bandwidth for the virtual carrier as for the centre band and, as explained above, a virtual carrier based on LTE can be of any size between 12 to 1188 sub-carriers. For example, in some systems, a virtual carrier having a bandwidth of less than 72 sub-carriers may be considered as a waste of the virtual carrier terminal's receiver resources, but from another point of view, it may be considered as reducing the impact of the virtual carrier on the host carrier by increasing the bandwidth available to conventional LTE terminals. The bandwidth of a virtual carrier can therefore be adjusted to achieve the desired balance between complexity, resource utilization, host carrier performance and requirements for virtual carrier terminals.

Uplink Transmission Frame

So far, the virtual carrier has been discussed with reference to the downlink, however in some examples a virtual carrier can also be inserted in the uplink.

In mobile communications systems such as LTE, the frame structure and sub-carrier spacing employed in the uplink correspond to that used in the downlink (as shown for example in FIG. 2). In frequency division duplex (FDD) networks both the uplink and downlink are active in all sub-frames, whereas in time division duplex (TDD) networks sub-frames can either be assigned to the uplink, to the downlink, or further sub-divided into uplink and downlink portions.

In order to initiate a connection to a network, conventional LTE terminals make a random access request on the physical random access channel (PRACH). The PRACH is located in predetermined blocks of resource elements in the uplink frame, the positions of which are signaled to the LTE terminals in the system information signaled on the downlink.

Additionally, when there is pending uplink data to be transmitted from an LTE terminal and the terminal does not already have any uplink resources allocated to it, it can transmit a random access request PRACH to the base station. A decision is then made at the base station as to which if any uplink blocks of resource elements are to be allocated to the mobile terminal that has made the request. Uplink resource block allocations are then signaled to the LTE terminal on the physical downlink control channel (PDCCH) transmitted in the control region of the downlink sub-frame.

In LTE, transmissions from each mobile terminal are constrained to occupy a set of contiguous resource blocks. For the physical uplink shared channel (PUSCH) the uplink resource allocation grant received from the base station will indicate which set of resource blocks to use for that transmission, where these resource blocks could be located anywhere within the channel bandwidth.

The first resources used by the LTE physical uplink control channel (PUCCH) are located at both the upper and lower edge of the channel, where each PUCCH transmission occupies one resource block. In the first half of a sub-frame this resource block is located at one channel edge, and in the second half of a sub-frame this resource block is located at the opposite channel edge. As more PUCCH resources are required, additional resource blocks are assigned in a sequential manner, moving inward from the channel edges. Since PUCCH signals are code division multiplexed, an LTE uplink can accommodate multiple PUCCH transmissions in the same resource block.

Virtual Uplink Carrier

In accordance with embodiments of the present invention, the virtual carrier terminals described above can also be provided with a reduced capability transmitter for transmitting uplink data. The virtual carrier terminals are arranged to transmit data across a reduced bandwidth. The provision of a reduced capability transmitter unit provides corresponding advantages to those achieved by providing a reduced capability receiver unit with, for example, classes of devices that are manufactured with a reduced capability for use with, for example, MTC type applications.

Figure 13A:
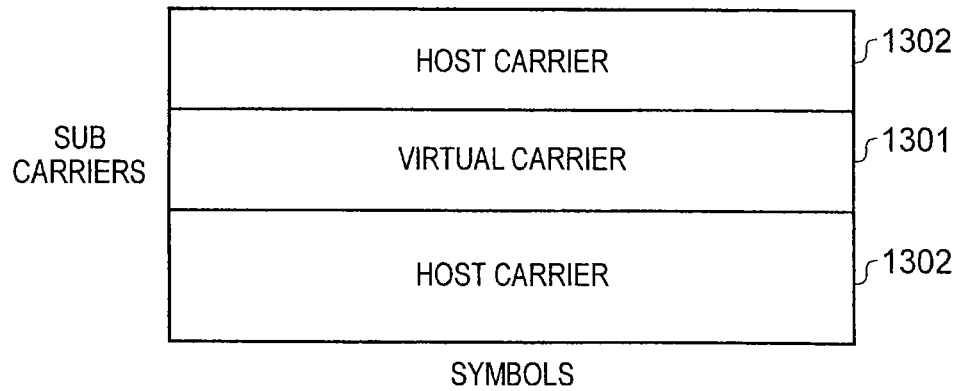
FIGS. 13A to 13C provide schematic diagrams illustrating LTE uplink sub-frames in which an uplink virtual carrier has been inserted in accordance with an embodiment of the present invention, and FIG. 14 provides a schematic diagram showing part of an adapted LTE mobile telecommunication network arranged in accordance with an example of the present invention.

In correspondence with the downlink virtual carrier, the virtual carrier terminals transmit uplink data across a reduced range of sub-carriers within a host carrier that has a greater bandwidth than that of the reduced bandwidth virtual carrier. This is shown in FIG. 13*a*. As can be seen from FIG. 13*a*, a group of sub-carriers in an uplink sub-frame form a virtual carrier 1301 within a host carrier 1302. Accordingly, the reduced bandwidth across which the virtual carrier terminals transmit uplink data can be considered a virtual uplink carrier.

In order to implement the virtual uplink carrier, the base station scheduler serving a virtual carrier ensures that all uplink resource elements granted to virtual carrier terminals are sub-carriers that fall within the reduced bandwidth range of the reduced capability transmitter units of the virtual carrier terminals. Correspondingly, the base station scheduler serving the host carrier typically ensures that all uplink resource elements granted to host carrier terminals are sub-carriers that fall outside the set of sub-carriers occupied by the virtual carrier terminals. However, if the schedulers for the virtual carrier and the host carrier are implemented jointly, or have means to share information, then the scheduler of the host carrier can assign resource elements from within the virtual carrier region to mobile terminals on the host carrier during sub-frames when the virtual carrier scheduler indicates that some or all of the virtual carrier resources will not be used by mobile terminals on the virtual carrier.

If a virtual carrier uplink incorporates a physical channel that follows a similar structure and method of operation to the LTE PUCCH, where resources for that physical channel are expected to be at the channel edges, for virtual carrier terminals these resources would preferentially be at the edges of the virtual carrier and not at the edges of the host carrier. This is advantageous since it would ensure that virtual carrier uplink transmissions remain within the reduced virtual carrier bandwidth.

Virtual Uplink Carrier Random Access

In accordance with conventional LTE techniques, it cannot be guaranteed that the PRACH will be within the sub-carriers allocated to the virtual carrier. In some embodiments therefore, the base station provides a secondary PRACH within the virtual uplink carrier, the location of which can be signaled to the virtual carrier terminals via system information on the virtual carrier. This is shown for example in FIG. 13*b* in which a PRACH 1303 is located within the virtual carrier 1301. Thus, the virtual carrier terminals send PRACH requests on the virtual carrier PRACH within the virtual uplink carrier. The position of the PRACH can be signaled to the virtual carrier terminals in a virtual carrier downlink signaling channel, for example in system information on the virtual carrier.

Figure 13B:
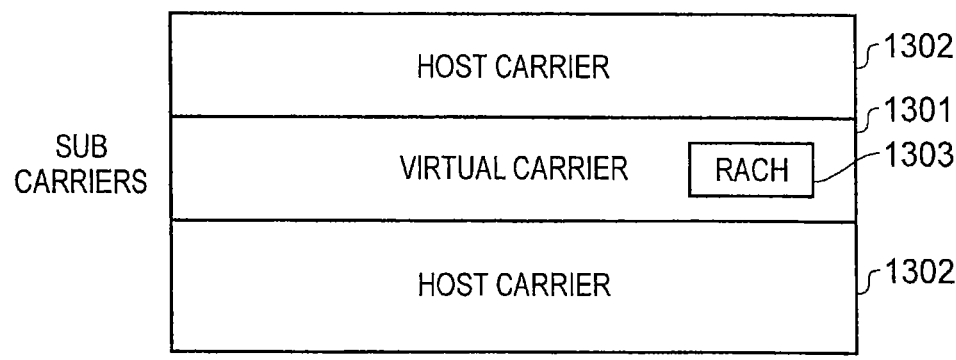
Figure 13C:
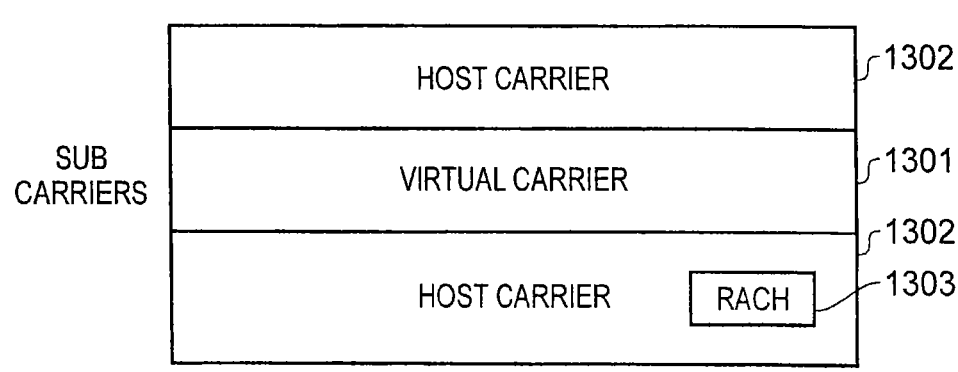

However, in other examples, the virtual carrier PRACH 1303 is situated outside of the virtual carrier as shown for example in FIG. 13*c*. This leaves more room within the virtual uplink carrier for the transmission of data by the virtual carrier terminals. The position of the virtual carrier PRACH is signaled to the virtual carrier terminals as before but in order to transmit a random access request, the virtual carrier terminals re-tune their transmitter units to the virtual carrier PRACH frequency because it is outside of the virtual carrier. The transmitter units are then re-tuned to the virtual carrier frequency when uplink resource elements have been allocated.

In some examples where the virtual carrier terminals are capable of transmitting on a PRACH outside of the virtual carrier, the position of the host carrier PRACH can be signaled to the virtual carrier terminals. The virtual carrier terminals can then simply use the conventional host carrier PRACH resource to send random access requests. This approach is advantageous as fewer PRACH resources have to be allocated.

However, if the base station is receiving random access requests from both conventional LTE terminals and virtual carrier terminals on the same PRACH resource, it is necessary that the base station is provided with a mechanism for distinguishing between random access requests from conventional LTE terminals and random access requests from virtual carrier terminals.

Therefore, in some examples a time division allocation is implemented at the base station whereby, for example, over a first set of sub-frames the PRACH allocation is available to the virtual carrier terminals and over a second set of sub-frames the PRACH allocation is available to conventional LTE terminals. Accordingly, the base station can determine that random access requests received during the first set of sub-frames originate from virtual carrier terminals and random access requests received during the second set of sub-frames originate from conventional LTE terminals.

In other examples, no mechanism is provided to prevent both virtual carrier terminals and conventional LTE terminals transmitting random access requests at the same time. However, the random access preambles that are conventionally used to transmit a random access request are divided into two groups. The first group is used exclusively by virtual carrier terminals and the second group is used exclusively by conventional LTE terminals. Accordingly, the base station can determine whether a random request originated from a conventional LTE terminal or a virtual carrier terminal simply by ascertaining to what group the random access preamble belongs.

Example Architecture

Figure 14:
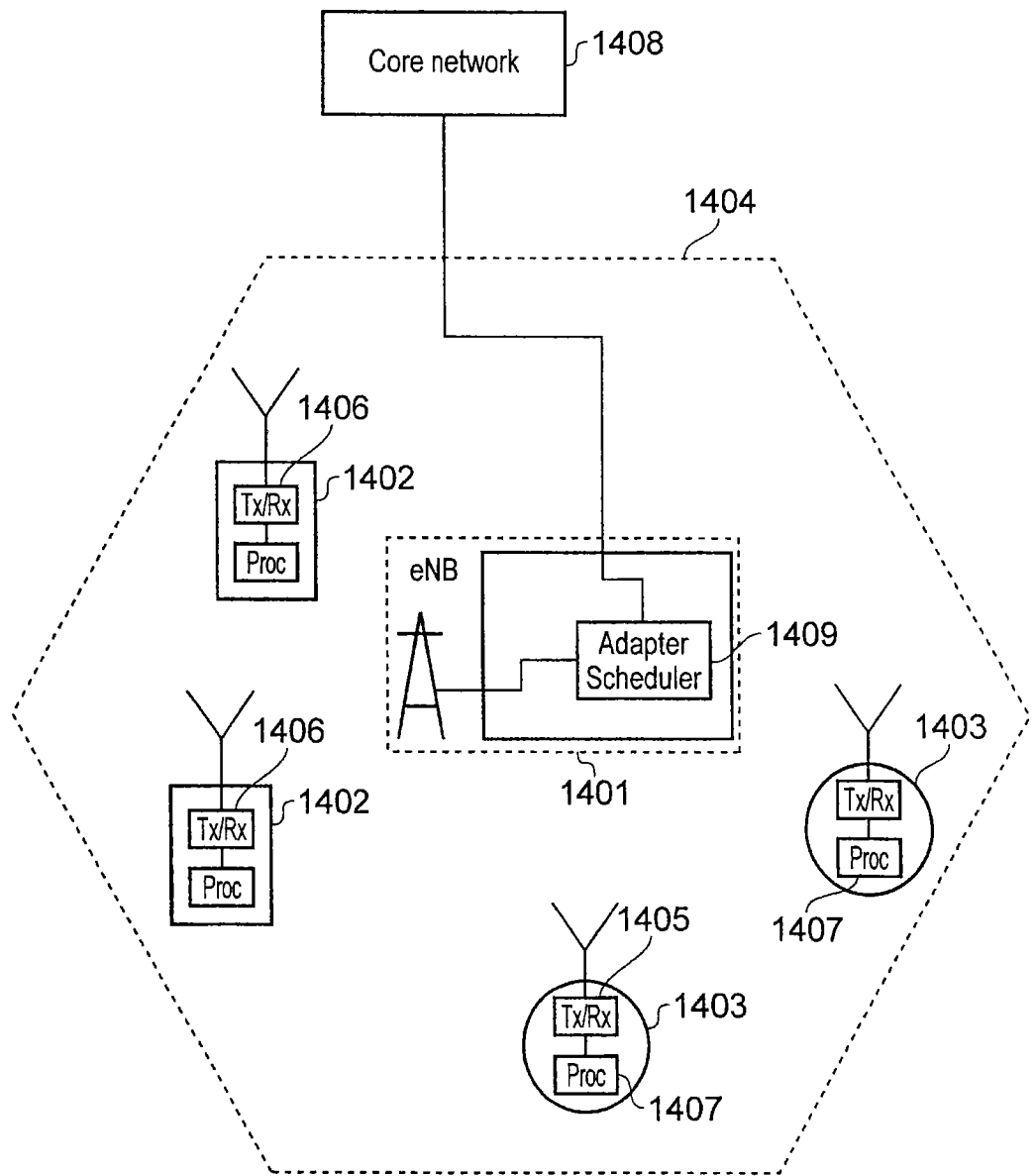

FIG. 14 provides a schematic diagram showing part of an adapted LTE mobile telecommunication system arranged in accordance with an example of the present invention. The system includes an adapted enhanced Node B (eNB) 1401 connected to a core network 1408 which communicates data to a plurality of conventional LTE terminals 1402 and reduced capability terminals 1403 within a coverage area (i.e. cell) 1404. Each of the reduced capability terminals 1403 has a transceiver unit 1405 which includes a receiver unit capable of receiving data across a reduced bandwidth and a transmitter unit capable of transmitting data across a reduced bandwidth when compared with the capabilities of the transceiver units 1406 included in the conventional LTE terminals 1402.

The adapted eNB 1401 is arranged to transmit downlink data using a sub-frame structure that includes a virtual carrier as described with reference to FIG. 5 and to receive uplink data using a sub-frame structure as described with reference to FIG. 13*b* or 13*c*. The reduced capability terminals 1403 are thus able to receive and transmit data using the uplink and downlink virtual carriers as described above.

As has been explained above, because the reduced complexity terminals 1403 receive and transmit data across a reduced bandwidth on the uplink and downlink virtual carriers, the complexity, power consumption and cost of the transceiver unit 1405 needed to receive and decode downlink data and to encode and transmit uplink data is reduced compared to the transceiver unit 1406 provided in the conventional LTE terminals.

When receiving downlink data from the core network 1408 to be transmitted to one of the terminals within the cell 1404, the adapted eNB 1401 is arranged to determine if the data is bound for a conventional LTE terminal 1402 or a reduced capability terminal 1403. This can be achieved using any suitable technique. For example, data bound for a reduced capability terminal 1403 may include a virtual carrier flag indicating that the data must be transmitted on the downlink virtual carrier. If the adapted eNB 1401 detects that downlink data is to be transmitted to a reduced capability terminal 1403, an adapted scheduling unit 1409 included in the adapted eNB 1401 ensures that the downlink data is transmitted to the reduced capability terminal in question on the downlink virtual. In another example the network is arranged so that the virtual carrier is logically independent of the eNB. More particularly the virtual carrier is arranged to appear to the core network as a distinct cell. From the perspective of the core network it is not known that the virtual carrier is physically co-located with, or has any interaction with, the host carrier of the cell. Packets are routed to/from the virtual carrier just as they would be for any normal cell.

In another example, packet inspection is performed at a suitable point within the network to route traffic to or from the appropriate carrier (i.e. the host carrier or the virtual carrier).

In yet another example, data from the core network to the eNB is communicated on a specific logical connection for a specific mobile terminal. The eNB is provided with information indicating which logical connection is associated with which mobile terminal. Information is also provided at the eNB indicating which mobile terminals are virtual carrier terminals and which are conventional LTE terminals. This information could be derived from the fact that a virtual carrier terminal would initially have connected using virtual carrier resources. In other examples virtual carrier terminals are arranged to indicate their capability to the eNB during the connection procedure. Accordingly the eNB can map data from the core network to a specific mobile terminal based on whether the mobile terminal is a virtual carrier terminal or an LTE terminal.

When scheduling resources for the transmission of uplink data, the adapted eNB 1401 is arranged to determine if the terminal to be scheduled resources is a reduced capability terminal 1403 or a conventional LTE terminal 1402. In some examples this is achieved by analysing the random access request transmitted on the PRACH using the techniques to distinguish between a virtual carrier random access request and a conventional random access request as described above. In any case, when it has been determined at the adapted eNB 1401 that a random access request has been made by a reduced capability terminal 1402, the adapted scheduler 1409 is arranged to ensure that any grants of uplink resource elements are within the virtual uplink carrier.

In some examples, the virtual carrier inserted within the host carrier can be used to provide a logically distinct "network within a network". In other words data being transmitted via the virtual carrier can be treated as logically and physically distinct from the data transmitted by the host carrier network. The virtual carrier can therefore be used to implement a so-called dedicated messaging network (DMN) which is "laid over" a conventional network and used to communicate messaging data to DMN devices (i.e. virtual carrier terminals).

As will be appreciated from the above descriptions, embodiments of the present invention can include the following examples:

A method of allocating transmission resources in an OFDM wireless telecommunication system arranged to communicate data using a plurality of OFDM sub-carriers, the method comprising:

allocating transmission resources provided by a first group of the plurality of OFDM sub-carriers within a first frequency band to terminals of a first type;

allocating transmission resources provided by a second group of the plurality of OFDM sub-carriers to terminals of a second type within a second frequency band, the second group being smaller than the first group and the second frequency band being selected from within the first frequency band;

transmitting control information comprising resource allocation information for terminals of the first type over a first bandwidth corresponding to the combined first and second groups of OFDM sub-carriers; and transmitting control information comprising resource allocation information for terminals of the second type over a second bandwidth corresponding to the second group of OFDM sub-carriers.

An OFDM wireless telecommunication system arranged to communicate data to and from a plurality of mobile terminals over a plurality of OFDM sub-carriers, the system comprising scheduling means arranged to allocate transmission resources provided by a first group of the plurality of OFDM sub-carriers within a first frequency band to mobile terminals of a first type and to allocate transmission resources provided by a second group of the plurality of OFDM sub-carriers within a second frequency band to terminals of a second type, the second group being smaller than the first group and the second frequency band being selected from within the first frequency band, and transmission means arranged to transmit control information comprising resource allocation information for terminals of the first type over a first bandwidth corresponding to the combined first and second groups of OFDM sub-carriers and to transmit control information comprising resource allocation information for terminals of the second type over a second bandwidth corresponding to the second group of OFDM sub-carriers.

A mobile terminal comprising a receiver unit for receiving data transmitted from a base station via a plurality of OFDM sub-carriers on a radio downlink and a transmitter for transmitting data to the base station via a plurality of OFDM sub-carriers on a radio uplink, the base station being arranged to transmit data to mobile terminals of a first type on a first group of a plurality of OFDM sub-carriers within a first frequency band and to transmit data to mobile terminals of a second type to which the mobile terminal belongs on a second group of the plurality of OFDM sub-carriers within a second frequency band, the second group being smaller than the first group and the second frequency band being selected from within the first frequency band, the base station being arranged to transmit control information comprising resource allocation information for terminals of the first type over a first bandwidth corresponding to the combined first and second groups of OFDM sub-carriers and to transmit control information comprising resource allocation information for terminals of the second type over a second bandwidth corresponding to the second group of OFDM sub-carriers, wherein the receiver unit of the mobile terminal is limited to receive data on the radio downlink over the second frequency band.

A mobile telecommunications system comprising mobile terminals of a first type and mobile terminals of a second type, the mobile terminals of the first type and second type being arranged to transmit uplink data to a network over a radio interface using a plurality of sub-carriers, the mobile terminals of the first type being arranged to transmit uplink data on a first group of sub-carriers of the plurality of sub-carriers over a first bandwidth and the mobile terminals of the second type being arranged to transmit uplink data on a second group of sub-carriers of the plurality of sub-carriers within the first group of sub-carriers over a second bandwidth, the second bandwidth being smaller than the first bandwidth, and the mobile terminals of the first type are arranged to transmit random access request messages to a base station of the network requesting uplink radio resources on a first random access channel and the mobile terminals of the second type are arranged to transmit random access request messages to the base station of the network requesting uplink radio resources on a second random access channel, wherein random access request messages transmitted on the second random access channel are transmitted on sub-carriers within the second group of sub-carriers.

A method of transmitting data from mobile terminals of a first type and mobile terminals of a second type in a mobile telecommunications system, the mobile terminals of the first type and the mobile terminals of the second type being arranged to transmit uplink data to a network over a radio interface using a plurality of sub-carriers, the mobile terminals of the first type being arranged to transmit uplink data on a first group of sub-carriers of the plurality of sub-carriers over a first bandwidth and the mobile terminals of the second type being arranged to transmit uplink data on a second group of sub-carriers of the plurality of sub-carriers within the first group of sub-carriers over a second bandwidth, the second bandwidth being smaller than the first bandwidth, the method comprising, in the event of pending uplink data to be transmitted from a mobile terminal of the first type and the mobile terminal of the first type requiring an allocation of uplink resources:

transmitting from the mobile terminal of the first type a random access request message to a base station of the network requesting uplink radio resources on a first random access channel, and in the event of pending uplink data to be transmitted from a mobile terminal of the second type and the mobile terminal of the second type requiring an allocation of uplink resources:

transmitting from the mobile terminal of the second type a random access request message to a base station of the network requesting uplink radio resources on a second random access channel, wherein random access request messages transmitted on the second random access channel are transmitted on sub-carriers within the second group of sub-carriers.

Various modifications can be made to examples of the present invention. Embodiments of the present invention have been defined largely in terms of reduced capability terminals transmitting data via a virtual carrier inserted in a conventional LTE based host carrier. However, it will be understood that any suitable device can transmit and receive data using the described virtual carriers for example devices which have the same capability as a conventional LTE type terminal or devices which have enhanced capabilities.

Furthermore, it will be understood that the general principle of inserting a virtual carrier on a subset of uplink or downlink resources can be applied to any suitable mobile telecommunication technology and need not be restricted to systems employing an LTE based radio interface.

The invention claimed is:

1. An electronic device comprising:
   circuitry configured to
   communicate with the mobile communications devices via a plurality of resource elements across a first range of system resource blocks;
   transmit data to a first group of mobile communications devices, wherein the data is distributed within the plurality of resource elements across the first range of system resource blocks;
   provide a virtual carrier including one or more resource elements across a second range of system resource blocks which is within and smaller than the first range; and
   transmit data for a second group of mobile communications devices via the virtual carrier, wherein the second range of system resource blocks includes fewer than one hundred resource blocks.

2. The electronic device of claim 1, wherein
the circuitry is configured to provide a plurality of virtual carriers.

3. The electronic device of claim 1, wherein
the virtual carrier includes a channel in a same frequency range as a physical broadcast channel for devices in the first group of mobile communications devices to connect to the network element.

4. The electronic device of claim 1, wherein
the circuitry is configured to provide on one or more resource elements a virtual carrier signal indicating that a virtual carrier is provided.

5. The electronic device of claim 4, wherein
the signal comprises an indication of a location of a virtual carrier within the first range of system resource blocks and/or an indication of bandwidth of the virtual carrier.

6. The electronic device of claim 4, wherein
the circuitry is configured to provide a virtual carrier signal in a physical broadcast channel.

7. The electronic device of claim 6, wherein
the physical broadcast channel is a channel provided by the network element for devices in the first group of mobile communications devices to connect to the network element.

8. The electronic device of claim 4, wherein
the circuitry is configured to provide a virtual carrier signal in respect of a certain virtual carrier within the certain virtual carrier.

9. The electronic device of claim 8, wherein
the virtual carrier signal is provided in some or all sub-carriers across the virtual carrier and in one or more OFDM symbols.

10. The electronic device of claim 4, wherein
the virtual carrier signal is not provided in every sub-frame.

11. The electronic device of claim 1, wherein
the electronic device is configured for use in a system arranged in accordance with 3GPP Long Term Evolution specifications.

12. The electronic device of claim 1, wherein the second range of system resource blocks has a bandwidth of six resource blocks.

13. An electronic device comprising:
    circuitry configured to
    communicate with mobile communications devices via a plurality of resource elements across a first range of system resource blocks;
    transmit data to a first group of mobile communications devices, wherein the data is distributed within the plurality of resource elements across the first range of system resource blocks;
    provide a virtual carrier including one or more resource elements across a second range of system resource blocks which is within and smaller than the first range; and
    transmit data for a second group of mobile communications devices via the virtual carrier;
    transmit data in time-adjacent sub-frames;
    allocate to the virtual carrier one or more resource elements within the second range of system resource blocks in a first sub-frame; and
    allocate to the virtual carrier one or more resource elements within a third range of system resource blocks in the sub-frame after the first sub-frame, wherein the third range of system resource blocks is within and smaller than the first range of system resource blocks.

14. The electronic device of claim 13, wherein
the virtual carrier bandwidth and/or range changes at a regular interval, or the virtual carrier bandwidth and/or range changes every sub-frame or every 10 sub-frames.

15. The electronic device of claim 13, wherein
the third range of system resource blocks is same as the second range of system resource blocks.

16. The electronic device of claim 13, wherein
the circuitry is configured to change a range of system resource blocks from the second range of system resource blocks to the third range of system resource blocks based on a pseudo-random algorithm.

17. A base station comprising:
circuitry configured to
provide a wireless access interface for communicating with mobile communications devices, the wireless access interface providing a plurality of resource elements across a first plurality of system resource blocks;
transmit data to a first group of mobile communications devices, wherein the data is distributed within the plurality of resource elements across the first plurality of system resource blocks;
provide a virtual carrier, the virtual carrier providing one or more resource elements across a second plurality of system resource blocks which are a subset of the first plurality of system resource blocks; and
transmit data for a second group of mobile communications devices via the virtual carrier, wherein
the at least one of the second plurality of system resource blocks includes fewer than one hundred resource blocks.

18. A user equipment comprising:
circuitry configured to
perform a synchronization process with a base station based on a primary synchronization signal (PSS) and secondary synchronization signal (SSS) received in respective first and sixth sub-frames of a radio frame transmitted by the base station;
decode a physical broadcast channel (PBCH) including a master information block (MIB) that indicates a bandwidth of a downlink carrier, a system frame number (SFN) and a physical hybrid automatic request (HARQ) indicator channel (PHICH) configuration;
identify a virtual carrier provided by the base station based on the decoded PBCH, wherein the virtual carrier includes one or more resource elements across a first plurality of system resource blocks that includes fewer than one hundred resource blocks and that are a subset of a second plurality of system resource blocks provided for other user equipment that is included in a group different from that in which the user equipment is included; and
receive data transmitted by the base station in the identified virtual carrier, wherein
the second plurality of system resource blocks includes fewer than one hundred resource blocks.

19. An electronic device comprising:
circuitry configured to
provide a downlink wireless access interface for communicating with mobile communications devices, the wireless access interface providing a plurality of resource elements across a first plurality of system resource blocks;
transmit data to a first group of mobile communications devices, wherein the data is distributed within the plurality of resource elements across the first plurality of system resource blocks;
provide a virtual downlink carrier via the wireless access interface, the virtual downlink carrier providing one or more resource elements across a second plurality of system resource blocks including fewer than one hundred resource blocks which are a subset of the first plurality of system resource blocks;
transmit data identifying sub-carriers allocated for a physical random access channel in a virtual uplink carrier to the second group of mobile communications devices via the virtual downlink carrier; and
receive a random access request from at least one mobile communication device of the group of mobile communication devices in a sub-carrier allocated for a physical random access channel.

* * * * *